United States Patent
Wan et al.

(10) Patent No.: US 10,609,310 B2
(45) Date of Patent: *Mar. 31, 2020

(54) COMPACT COLOR AND DEPTH IMAGING SYSTEM

(71) Applicant: Google LLC, Mountain View, CA (US)

(72) Inventors: Chung Chun Wan, San Jose, CA (US); Jamyuen Ko, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,458

(22) Filed: Sep. 12, 2019

(65) Prior Publication Data

US 2020/0077037 A1    Mar. 5, 2020

Related U.S. Application Data

(63) Continuation of application No. 16/122,224, filed on Sep. 5, 2018, now Pat. No. 10,440,294.

(51) Int. Cl.
| | |
|---|---|
| *H04N 5/225* | (2006.01) |
| *H04N 9/04* | (2006.01) |
| *H04N 5/33* | (2006.01) |
| *G01J 5/08* | (2006.01) |

(Continued)

(52) U.S. Cl.
CPC ............ *H04N 5/332* (2013.01); *G01J 5/0803* (2013.01); *H04N 5/2258* (2013.01); *H04N 7/18* (2013.01); *H04N 9/045* (2013.01); *H04N 9/646* (2013.01)

(58) Field of Classification Search
CPC .......... H04N 5/332; H04N 7/18; H04N 9/646; H04N 5/2258; H04N 9/045; G01J 5/0803
See application file for complete search history.

(56) References Cited

U.S. PATENT DOCUMENTS

| | | | |
|---|---|---|---|
| 8,446,470 B2 | 5/2013 | Lu et al. | |
| 8,599,264 B2 * | 12/2013 | Schmidt | G06K 9/2018 348/162 |

(Continued)

OTHER PUBLICATIONS

Mexperts [online]. "ON Semiconductor Launches RGB+IR Version of AR0237 Image Sensor for Surveillance," [Retrieved on Apr. 4, 2018], Retrieved from: URL https://www.presseagentur.com/framos/detail.php?pr_id=4658&lang=en, 2 pages.

(Continued)

*Primary Examiner* — Hung H Lam
(74) *Attorney, Agent, or Firm* — Fish & Richardson P.C.

(57) ABSTRACT

Methods, systems, and apparatus, including computer programs encoded on a computer storage medium, for depth imaging. In one aspect, a method includes obtaining, by an image sensor that includes infrared pixels and color pixels, a first image of a scene while the image sensor is in a first position, moving the image sensor to a second position, wherein, in the second position, a particular infrared pixel is located where a particular color pixel was previously located when the image sensor was in the first position, obtaining, by the image sensor, a second image of the scene while the image sensor is in the second position, generating a composite image based on the first image and the second image, and determining an estimated distance to an object within the scene based on the composite image.

20 Claims, 4 Drawing Sheets

(51) Int. Cl.
*H04N 7/18* (2006.01)
*H04N 9/64* (2006.01)

(56) References Cited

U.S. PATENT DOCUMENTS

| | | | | |
|---|---|---|---|---|
| 8,928,654 | B2* | 1/2015 | Givon | G06T 17/00 |
| | | | | 345/419 |
| 9,204,062 | B2 | 12/2015 | Bergstrom et al. | |
| 10,136,107 | B2* | 11/2018 | Keelan | H04N 9/64 |
| 2004/0174446 | A1 | 9/2004 | Acharya | |
| 2008/0030460 | A1* | 2/2008 | Hildreth | G06T 19/006 |
| | | | | 345/156 |
| 2009/0050806 | A1* | 2/2009 | Schmidt | H04N 5/23212 |
| | | | | 250/332 |
| 2010/0270469 | A1* | 10/2010 | Johnson | G02B 7/10 |
| | | | | 250/330 |
| 2014/0240492 | A1 | 8/2014 | Lee | |
| 2014/0307140 | A1* | 10/2014 | Hayashi | H04N 9/07 |
| | | | | 348/281 |
| 2015/0304638 | A1 | 10/2015 | Cho et al. | |

OTHER PUBLICATIONS

PCT International Search Report and Written Opinion in International Appln. PCT/US2019/041410, dated Sep. 10, 2019, 17 pages.
PentaxForums [online, "How Pentax Pixel Shifting Works Article and Tips", dated Apr. 22, 2015, [retrieved on Aug. 21, 2019], retrieved from: URL<https://www.pentaxforums.com/articles/photo-articles/how-pentax-k-3-ii-pixel-shi fting-works.html>, 9 pages.
www.ricoh-imaging.com [online] "RICOH. Imagine. Change. Rico Imaging Company, LTD." [Retrieved on Jul. 31, 2018] Retrieved from: URL http://www.ricoh-imaging.co.jp/english/index.html, 2 pages.

* cited by examiner

COMPACT COLOR AND DEPTH IMAGING SYSTEM

CROSS-REFERENCE TO RELATED APPLICATIONS

The present invention is a continuation of U.S. Patent Application Ser. No. 16/122,224, filed Sep. 5, 2018, now allowed. The contents of the prior application are incorporated herein by reference in their entirety.

BACKGROUND

Electronic devices sometimes include depth imaging systems. Such a depth imaging system may enable an electronic device to determine three-dimensional (3-D) features of an object that is located in front of the electronic device.

SUMMARY

This document describes techniques, methods, systems, and other mechanisms for color and depth imaging. Depth imaging may be used in various devices such as mobile computing devices. Some example applications of depth imaging are facial recognition and augmented reality where the depth imaging sensor is facing the user, and augmented reality and room mapping where the depth imaging sensor is world-facing, e.g., facing away from the user.

Including a depth imaging sensor into a mobile computing device may enable various new applications on devices. However, physical space may be particularly limited in mobile computing devices. For example, a major trend is maximizing the display while minimizing the bezels. With ever shrinking bezel size, physical space for putting various sensors becomes more and more limited. Therefore, adding an additional depth imaging sensor to those mobile computing devices is a challenge in terms of physical space.

Instead of adding an additional depth imaging sensor to a mobile computing device, depth imaging capability may be combined into a color imaging sensor that may already be included in mobile computing devices. For example, a mobile computing device may include a Red Green Blue Infrared Red (RGB-IR) sensor that, in addition to regular color-sensitive RGB pixels, also includes infrared-sensitive infrared pixels.

A RGB-IR sensor, when paired with a corresponding IR emitter, can be used to produce both color and depth images. For example, in one implementation, the emitter can be a dot projector such that depth images can be computed using a technique called structured light. In another implementation, the dot projector may include an additional IR-only camera so that depth can be computed using another technique called active stereo. However, in both implementations, there may be a problem that the resolution of the IR image is heavily reduced because the number of infrared pixels is smaller than the number of total pixels in the RGB-IR sensor. In addition to a reduction, or sub-sampling, of IR resolution, some dots that are emitted by the dot projector may not be captured by the RGB-IR sensors when the projection is imaged onto RGB pixels that are not IR-sensitive.

In one implementation of a RGB-IR sensor, only one fourth of the pixels are IR-pixels and the remaining pixels are RGB pixels, which may equate to about three fourths of the dots emitted by the dot projectors not being captured and used. For example, if the native resolution of a RGB-IR sensor is VGA, i.e. 640x480, the IR image may only have one fourth of this resolution, i.e., 160x120. Also, assuming the dot projector emits in total five thousand dots that are uniformly distributed in space, only one thousand two hundred fifty of these dots may be captured by the sensor. Regarding the color imaging side, as compared to a normal RGB sensor, since some RGB pixels are replaced by infrared pixels, color image quality may also be degraded because some color channels are sub-sampled as compared with a regular RGB sensor. For the sake of the color quality, there can be even less infrared pixels in a RGB-IR sensor, e.g. one sixteenth of the pixels being infrared pixels. However, the IR image resolution would then also only be one sixteenth of the native sensor resolution and only one sixteenth of dots may be captured.

These potential problems associated with use of an RGB-IR sensor may be solved by physically moving the RGB-IR sensor to various positions, obtaining an image for each of the positions, and then generating a composite image from the images for each position. For example, the RGB-IR sensor may be moved to different positions and infrared images from the different positions may be used to generate a composite infrared image that includes a higher resolution than any single image that was obtained from the infrared images. A depth image may then be determined from the composite infrared image. Similarly, the system may use color images from the different positions to generate a composite color image that includes a higher resolution than any single image that was obtained from the color images. Accordingly, the system may reduce the physical space needed for depth imaging and color imaging while at the same time ensuring sufficient resolution of both color and depth images that are generated. Additionally, the use of a single RGB-IR sensor instead of a RGB sensor and a separate IR sensor may result in cost savings.

One innovative aspect of the subject matter described in this specification is embodied in a method that includes the actions of obtaining, by an image sensor that includes infrared pixels and color pixels, a first image of a scene while the image sensor is in a first position, moving the image sensor to a second position, where, in the second position, a particular infrared pixel is located where a particular color pixel was previously located when the image sensor was in the first position, obtaining, by the image sensor, a second image of the scene while the image sensor is in the second position, generating a composite image based on the first image and the second image, and determining an estimated distance to an object within the scene based on the composite image.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects moving the image sensor to a second position includes moving the image sensor to the second position such that the particular infrared pixel is located where a particular color pixel was previously located when the image sensor was in the first position, relative to a camera that includes the image sensor. In certain aspects, moving the image sensor to a second position includes moving the image sensor to the second position such that light from the scene that fell onto the particular color pixel in the first position instead falls onto the particular infrared pixel in the second position. In some implementations, moving the image sensor to a second position includes moving the image sensor to the second position such that light from the scene that fell onto the particular infrared pixel in the first position instead falls onto a second particular color pixel in the second position.

In certain aspects, generating a composite image based on the first image and the second image includes generating the composite image to include a first pixel from the particular infrared pixel while the image sensor was in the first position and a second pixel, at a different location in the composite image than the first pixel, from the particular infrared pixel while the image sensor was in the second position. In some implementations, the image sensor includes a pattern of infrared pixels and color pixels, where the pattern includes an infrared pixel, a first green color pixel adjacent and to the right of the infrared pixel, a red color pixel adjacent and below the first green pixel, and a second green color pixel adjacent and below the infrared pixel. In some aspects, actions include obtaining, by the image sensor, a third image of the scene while the image sensor is in a third position, where, in the third position, the particular infrared pixel is located where a second particular color pixel was previously located when the image sensor was in the first position and obtaining, by the image sensor, a fourth image of the scene while the image sensor is in a fourth position, where, in the fourth position, the particular infrared pixel is located where a third particular color pixel was previously located when the image sensor was in the first position, where generating a composite image based on the first image and the second image includes generating the composite image based on the first image, the second image, the third image, and the fourth image.

In some aspects, obtaining, by an image sensor that includes infrared pixels and color pixels, a first image of a scene while the image sensor is in a first position includes obtaining an infrared image of the scene from the infrared pixels in the image sensor and not from the color pixels in the image sensor. In certain aspects, obtaining, by an image sensor that includes infrared pixels and color pixels, a first image of a scene while the image sensor is in a first position includes obtaining a first infrared image with the infrared pixels while an infrared emitter is emitting infrared onto the scene and obtaining a first color image with the color pixels while the infrared emitter is not emitting infrared onto the scene, where generating a composite image based on the first image and the second image includes generating a composite infrared image based on the first infrared image and a second infrared image and generating a composite color image based on the first color image and a second color image.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
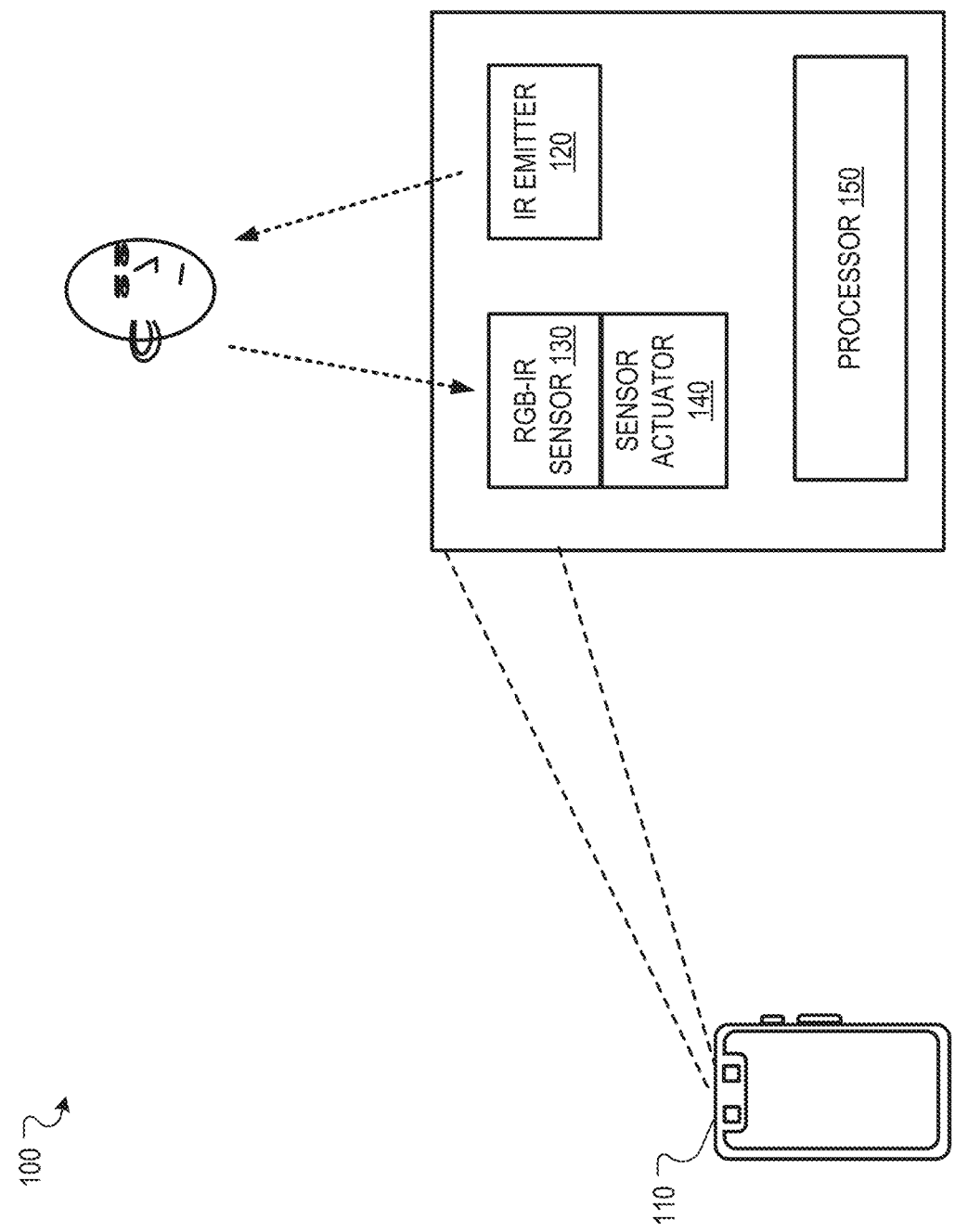
FIG. 1 is a conceptual diagram of a color and depth imaging system.

FIG. 1 is a conceptual diagram of a color and depth imaging system 100. The system 100 includes a mobile computing device 110 that includes an IR emitter 120, a RGB-IR sensor 130, a sensor actuator 140, and a processor 150. The mobile computing device 110 may be a smartphone, a tablet, or some other computing device.

The IR emitter 120 may emit infrared light for the system 100 to perform depth imaging. For example, the IR emitter 120 may emit infrared light so that the RGB-IR sensor 130 may detect reflections of the infrared light off objects and determine distances of the objects based on the detected reflections. In some implementations, the IR emitter 120 may be a dot projector such that depth images can be computed using the structured light technique. For example, a dot projector may project a uniform grid of dots where a greater apparent distance between dots corresponds to a greater distance from the IR emitter 120.

The RGB-IR sensor 130 may include infrared pixels and color pixels. The infrared pixels may be sensitive to IR light and the color pixels may be sensitive to red, green, or blue light. In some implementations, the color pixels may still be sensitive to some IR light, but more sensitive to the respective red, green, or blue color the pixel corresponds to, and the infrared pixels may still be sensitive to red, green, or blue, but more sensitive to IR light. The RGB-IR sensor may include the infrared pixels and color pixels arranged in particular patterns, as further described in relation to FIG. 2.

The sensor actuator 140 may be an actuator that is coupled to the RGB-IR sensor 130 such that the sensor actuator 140 may physically move the RGB-IR sensor 130. For example, the sensor actuator 140 may be a micro-electrical-mechanical system (MEMS) that is able to move the RGB-IR sensor 130. The sensor actuator 140 may be configured to be capable of moving the RGB-IR sensor 130 a distance of the physical size of one pixel of the RGB-IR sensor or a smaller distance at a time.

The processor 150 may control the IR emitter 120, the RGB-IR sensor 130, and the sensor actuator 140. For example, the processor 150 may control the IR emitter 120 to only emit IR when the processor 150 is obtaining an infrared image from the RGB-IR sensor 130 and control the sensor actuator 140 to move the RGB-IR sensor 130 to different positions such that light from a scene that falls onto a color pixel in the RGB-IR sensor 130 then falls onto an infrared pixel in the RGB-IR sensor 130.

The processor 150 additionally obtains images from the RGB-IR sensor 130 for the different positions and generates a composite image from the images. For example, the processor 150 may obtain four infrared images from the RGB-IR sensor 130, that each correspond to one of four different positions of the RGB-IR sensor 130, and generate a single composite image from the four infrared images, where the single composite infrared image has a higher resolution than any of the four infrared images.

The speed that the processor 150 moves the RGB-IR sensor 130 may be dependent on the frames per second of composite images that the system 100 is to provide. For example, if the system 100 is to provide thirty frames per second and the RGB-IR sensor 130 is moved to four different positions per composite image, the processor 150 may instruct the sensor actuator 140 move one hundred twenty times per second. The speed of movement of the RGB-IR sensor 130 may be sufficiently fast that a position and appearance of objects within the scene will not substantively change between the positions used to generate a single composite image.

In some implementations, movement of the RGB-IR sensor 130 may similarly be used to improve quality of a color image. For example, images from color pixels of the RGB-IR sensor 130 for two different positions, where a red pixel is re-located to a position where a red pixel previously wasn't located, may be combined to generate a composite color image. In some implementations, the IR light emitted from the IR emitter 120 may be detected by color pixels so the processor 150 may control the IR emitter 120 and the sensor actuator 140 so that a first infrared image is obtained while the IR emitter 120 is on, the IR emitter 120 turned off and a first color image obtained, the RGB-IR sensor 130 repositioned, a second color image obtained, the IR emitter 120 turned on and then a second infrared image obtained, the RGB-IR sensor 130 repositioned, a third infrared image obtained, the IR emitter 120 turned off, and a third color image obtained, etc. Accordingly, the system 100 may reduce interference caused by the IR emitter 120 with color pixels in the RGB-IR sensor 130 and also reduce the number of times the IR emitter 120 is turned on and off, which may increase the speed that the composite images are generated.

Figure 2:
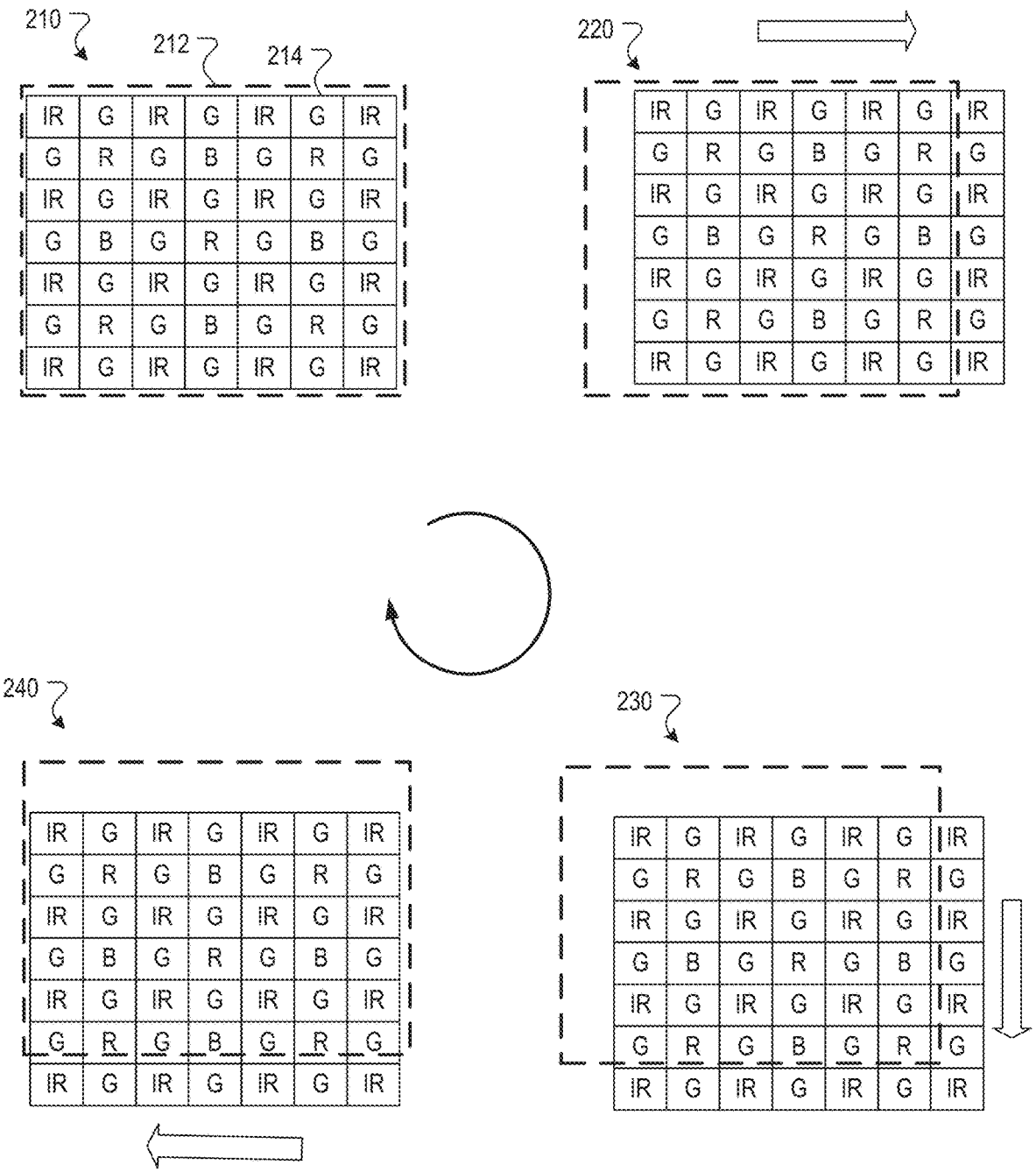
FIG. 2 is a conceptual diagram of movement of an example sensor in a color and depth imaging system.

FIG. 2 is a conceptual diagram of movement of an example sensor 214 in a color and depth imaging system. The sensor 214 includes multiple groups of four pixels where there is only a single infrared pixel. The sensor 214 is shown in a first position 210, a second position 220, a third position 230, and a fourth position 240. In the first position 210, light from part of the scene falls onto the upper left most pixel of the sensor 214, which is an infrared pixel. Additionally, in the first position 210, light from a different part of the scene falls onto the first green pixel adjacent and to the right of the upper left most pixel of the sensor 214, light from another different part of the scene falls onto the red pixel adjacent and below the first green below, and light from yet another different part of the scene falls onto a second green pixel adjacent and to the left of the red pixel. As can be seen in FIG. 2, with the first position 210 alone, the sensor 214 may only provide an infrared image with one fourth the resolution of a sensor where all the color pixels are instead infrared pixels.

In the second position 220, the sensor 214 has been moved a distance of one pixel to the right from the first position 210 such that the light from the portion of the scene that fell onto the first green pixel in the first position 210 now falls onto the infrared pixel. In the third position 230, the sensor 214 has been moved a distance of one pixel down from the second position 220 such that the light from the portion of the scene that fell onto the red pixel in the first position 210 now falls onto the infrared pixel. In the fourth position 240, the sensor 214 has been moved a distance of one pixel left from the third position 230 such that the light from the portion of the scene that fell onto the second green pixel in the first position 210 now falls onto the infrared pixel. From the fourth position 240, the sensor 214 may then move moved one pixel up to return to the first position 210.

The order of the positions shown in FIG. 2 is only a single example. For example, the order of the positions may be re-arranged so that the second position and fourth positions are reversed by having the sensor 214 move one pixel down, then one pixel to the right, and then one pixel up. Other positions may be used for other arrangements of infrared pixels and color pixels. For example, the system 100 may instead use an RGB-IR sensor where there is a single infrared pixel for every eight color pixels, where the single infrared pixel and eight color pixels are arranged in a three by three pixel square. The RGB-IR sensor may then be moved between nine positions such that, for each of the nine positions, the infrared pixel is positioned within a different pixel of the three by three pixel square.

In some implementations, the system 100 may move the RGB-IR sensor between the positions in a pattern that reduces a total distance that the RGB-IR sensor is moved. For example, for a two by two square, an infrared pixel of a particular square may be moved in a square pattern and, for a three by three square, an infrared pixel of a particular square may be moved in a spiral pattern.

In some implementations, the RGB-IR sensor may not be moved to different positions such that infrared pixels are moved to every position. For example, in a sensor with a single infrared pixel per three color pixels, using infrared images from only a first position and a second position may still increase a resolution in a composite infrared image from one fourth to one half, which may be sufficient resolution for some applications.

Figure 3:
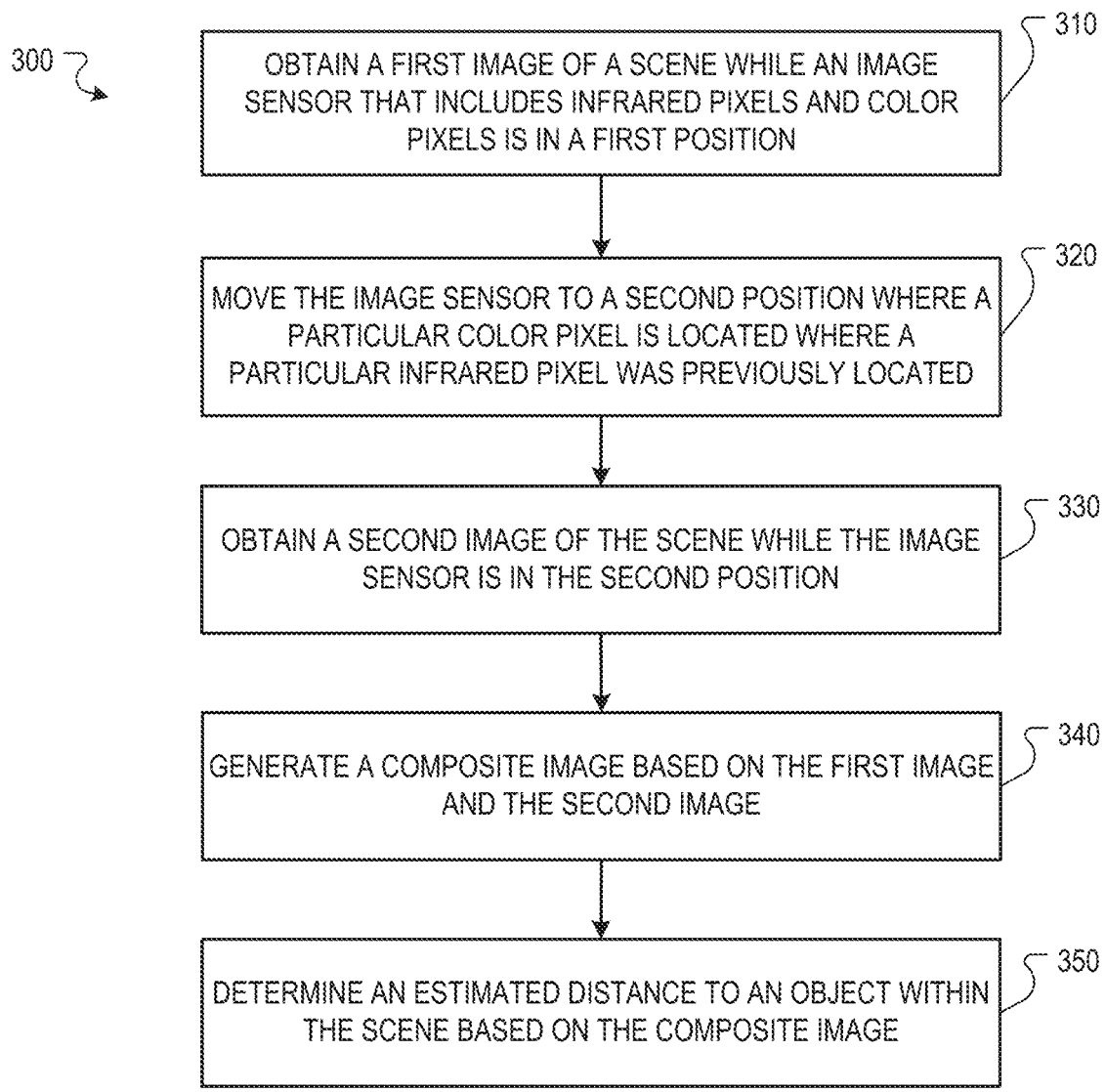
FIG. 3 is a flow diagram that illustrates an example of a process for depth imaging.

FIG. 3 is a flow diagram that illustrates an example of a process 300 for depth imaging. The operations of the process 300 may be performed by system 100 or other systems.

The process 300 includes obtaining a first image of a scene while an image sensor that includes infrared pixels and color pixels is in a first position (310). For example, the processor 150 may obtain a first infrared image of a person's face while the RGB-IR sensor 130 is in the first position 210.

In some implementations, the image sensor includes a pattern of infrared pixels and color pixels, where the pattern includes an infrared pixel, a first green color pixel adjacent and to the right of the infrared pixel, a red color pixel adjacent and below the first green pixel, and a second green color pixel adjacent and below the infrared pixel. For example, the RGB-IR sensor may include the upper most two by two square of pixels as shown in FIG. 2.

In some implementations, obtaining, by an image sensor that includes infrared pixels and color pixels, a first image of a scene while the image sensor is in a first position includes obtaining an infrared image of the scene from the infrared pixels in the image sensor and not from the color pixels in the image sensor. For example, the processor 150 may obtain an infrared image of the scene from output of the infrared pixels of the RGB-IR sensor 130 and not the color pixels of the RGB-IR sensor 130, and obtain a color image of the scene from output of the colored pixels and not the infrared pixels.

In some implementations, obtaining, by an image sensor that includes infrared pixels and color pixels, a first image of a scene while the image sensor is in a first position includes obtaining a first infrared image with the infrared pixels while an infrared emitter is emitting infrared onto the scene and obtaining a first color image with the color pixels while the infrared emitter is not emitting infrared onto the scene, where generating a composite image based on the first image and the second image includes generating a composite infrared image based on the first infrared image and a second infrared image and generating a composite color image based on the first color image and a second color image. For example, the processor 150 may control the IR emitter 120 to emit infrared light while the RGB-IR sensor 130 is being used to capture infrared images and to not emit infrared light while the RGB-IR sensor 130 is being used to capture color images.

The process 300 includes moving the image sensor to a second position where a particular color pixel is located where a particular infrared pixel was previously located (320). For example, the processor 150 may control the sensor actuator 140 to move the RGB-IR sensor 130 one pixel distance to the right into the second position 220.

In some implementations, moving the image sensor to a second position includes moving the image sensor to the second position such that the particular infrared pixel is located where a particular color pixel was previously located when the image sensor was in the first position, relative to a camera that includes the image sensor. For example, the sensor actuator 140 may move the RGB-IR sensor 130 a distance of one pixel while an exterior of the camera that includes the RGB-IR sensor 130 remains stationary relative to the scene.

In some implementations, moving the image sensor to a second position includes moving the image sensor to the second position such that light from the scene that fell onto the particular color pixel in the first position instead falls onto the particular infrared pixel in the second position. For example, the sensor actuator 140 may move the RGB-IR sensor 130 a distance of one pixel to the right such that light from the scene that fell on a green pixel in the first position 210 instead falls on the infrared pixel in the second position 220.

In some implementations, moving the image sensor to a second position includes moving the image sensor to the second position such that light from the scene that fell onto the particular infrared pixel in the first position instead falls onto a second particular color pixel in the second position. For example, the sensor actuator 140 may move the RGB-IR sensor 130 a distance of one pixel to the right such that light from the scene that fell on an infrared pixel in the first position 210 instead falls on a green pixel in the second position 220.

The process 300 includes obtaining a second image of the scene while the image sensor is in the second position (330). For example, the processor 150 may obtain a second infrared image of the person's face while the RGB-IR sensor 130 is in the second position 220.

The process 300 includes generating a composite image based on the first image and the second image (340). For example, the processor 150 may generate a composite infrared image by the first infrared image from while the RGB-IR sensor 130 is in the first position 210 and the second infrared image from while the RGB-IR sensor 130 is in the second position 220.

In some implementations, generating a composite image based on the first image and the second image includes generating the composite image to include a first pixel from the particular infrared pixel while the image sensor was in the first position and a second pixel, at a different location in the composite image than the first pixel, from the particular infrared pixel while the image sensor was in the second position. For example, the processor 150 may generate a composite infrared image by having the upper left most pixel of the composite infrared image have the value of the upper left most pixel from the first infrared image and having the pixel of the composite infrared image adjacent and to the right of the upper left most pixel have the value of the upper left most pixel from the second infrared image.

The process 300 includes determining an estimated distance to an object within the scene based on the composite image (350). For example, the processor 150 may determine a depth image that indicates distances of the person's nose, lips, ears, etc. from the mobile computing device 110 based on the apparent distance between dots in the composite infrared image.

In some implementations, the process 300 includes obtaining, by the image sensor, a third image of the scene while the image sensor is in a third position, where, in the third position, the particular infrared pixel is located where a second particular color pixel was previously located when the image sensor was in the first position, and obtaining, by the image sensor, a fourth image of the scene while the image sensor is in a fourth position, where, in the fourth position, the particular infrared pixel is located where a third particular color pixel was previously located when the image sensor was in the first position, where generating a composite image based on the first image and the second image includes generating the composite image based on the first image, the second image, the third image, and the fourth image. For example, the processor 150 may generate a composite infrared image by having the upper left most pixel of the composite infrared image have the value of the upper left most pixel from the first infrared image, having the pixel of the composite infrared image adjacent and to the right of the upper left most pixel have the value of the upper left most pixel from the second infrared image, having the pixel of the composite infrared image diagonal below and right of the upper left most pixel have the value of the upper left most pixel from the third infrared image, and having the pixel of the composite infrared image adjacent and below the upper left most pixel have the value of the upper left most pixel from the fourth infrared image.

Figure 4:
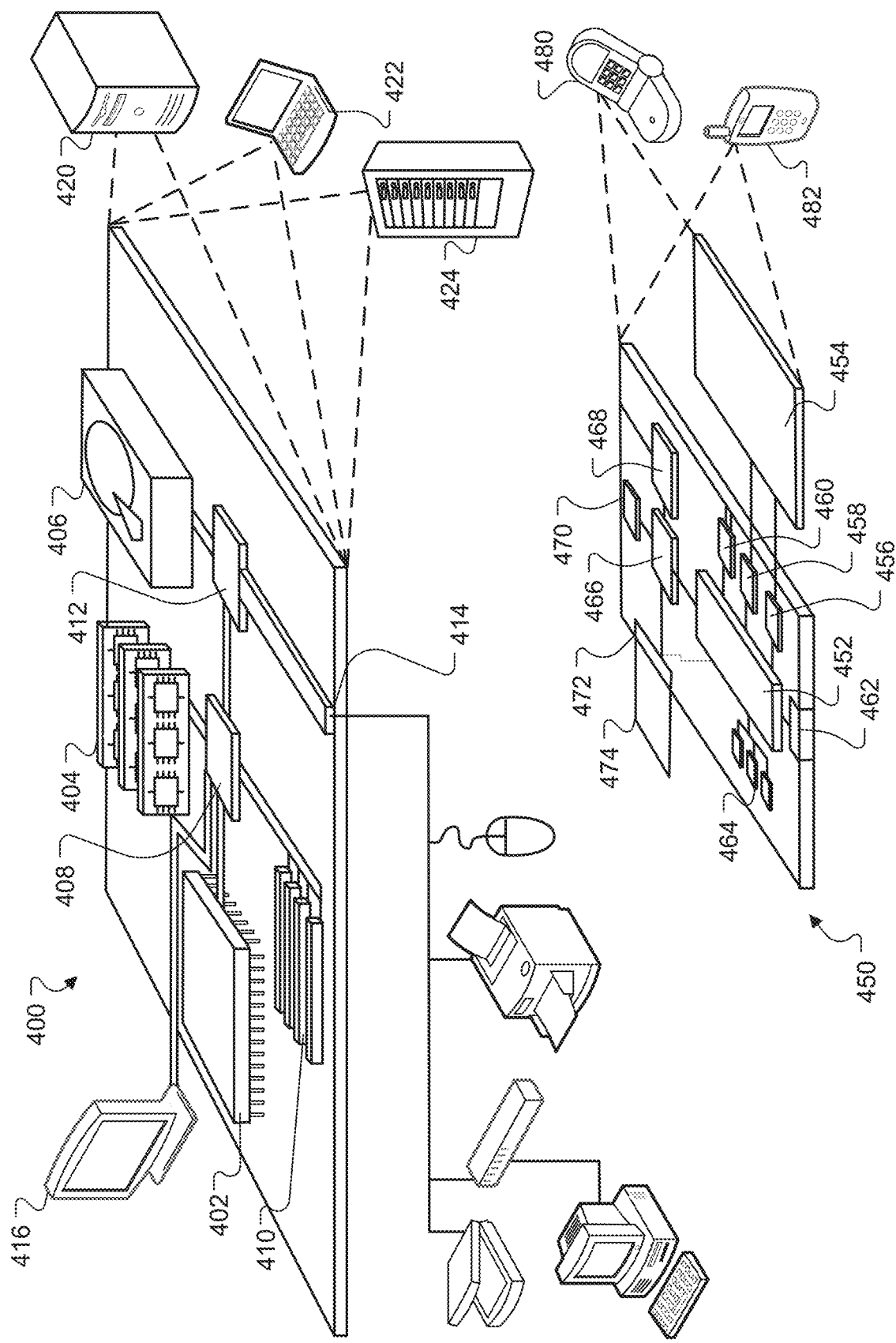
FIG. 4 is a block diagram of examples of computing devices that may be used to implement the systems and methods described in this document.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
    obtaining, by an image sensor that includes infrared pixels and color pixels, a first image of a scene while the image sensor is in a first position;
    moving the image sensor to a second position, wherein, in the second position, a particular infrared pixel is located where a particular color pixel was previously located when the image sensor was in the first position;
    obtaining, by the image sensor, a second image of the scene while the image sensor is in the second position; and
    generating a composite image based on the first image and the second image.

2. The method of claim 1, wherein moving the image sensor to a second position comprises:
moving the image sensor to the second position such that the particular infrared pixel is located where a particular color pixel was previously located when the image sensor was in the first position, relative to a camera that includes the image sensor.

3. The method of claim 1, wherein moving the image sensor to a second position comprises:
moving the image sensor to the second position such that light from the scene that fell onto the particular color pixel in the first position instead falls onto the particular infrared pixel in the second position.

4. The method of claim 1, wherein moving the image sensor to a second position comprises:
moving the image sensor to the second position such that light from the scene that fell onto the particular infrared pixel in the first position instead falls onto a second particular color pixel in the second position.

5. The method of claim 1, wherein generating a composite image based on the first image and the second image comprises:
generating the composite image to include a first pixel from the particular infrared pixel while the image sensor was in the first position and a second pixel, at a different location in the composite image than the first pixel, from the particular infrared pixel while the image sensor was in the second position.

6. The method of claim 1, wherein the image sensor includes a pattern of infrared pixels and color pixels, where the pattern includes an infrared pixel, a first green color pixel adjacent and to the right of the infrared pixel, a red color pixel adjacent and below the first green pixel, and a second green color pixel adjacent and below the infrared pixel.

7. The method of claim 6, comprising:
obtaining, by the image sensor, a third image of the scene while the image sensor is in a third position, wherein, in the third position, the particular infrared pixel is located where a second particular color pixel was previously located when the image sensor was in the first position; and
obtaining, by the image sensor, a fourth image of the scene while the image sensor is in a fourth position, wherein, in the fourth position, the particular infrared pixel is located where a third particular color pixel was previously located when the image sensor was in the first position,
wherein generating a composite image based on the first image and the second image comprises:
generating the composite image based on the first image, the second image, the third image, and the fourth image.

8. The method of claim 1, wherein obtaining, by an image sensor that includes infrared pixels and color pixels, a first image of a scene while the image sensor is in a first position comprises:
obtaining an infrared image of the scene from the infrared pixels in the image sensor and not from the color pixels in the image sensor.

9. The method of claim 1, wherein obtaining, by an image sensor that includes infrared pixels and color pixels, a first image of a scene while the image sensor is in a first position comprises:
obtaining a first infrared image with the infrared pixels while an infrared emitter is emitting infrared onto the scene; and
obtaining a first color image with the color pixels while the infrared emitter is not emitting infrared onto the scene,
wherein generating a composite image based on the first image and the second image comprises:
generating a composite infrared image based on the first infrared image and a second infrared image; and
generating a composite color image based on the first color image and a second color image.

10. A system comprising:
one or more computers and one or more storage devices storing instructions that are operable, when executed by the one or more computers, to cause the one or more computers to perform operations comprising:
obtaining, by an image sensor that includes infrared pixels and color pixels, a first image of a scene while the image sensor is in a first position;
moving the image sensor to a second position, wherein, in the second position, a particular infrared pixel is located where a particular color pixel was previously located when the image sensor was in the first position;
obtaining, by the image sensor, a second image of the scene while the image sensor is in the second position; and
generating a composite image based on the first image and the second image.

11. The system of claim 10, wherein moving the image sensor to a second position comprises:
moving the image sensor to the second position such that the particular infrared pixel is located where a particular color pixel was previously located when the image sensor was in the first position, relative to a camera that includes the image sensor.

12. The system of claim 10, wherein moving the image sensor to a second position comprises:
moving the image sensor to the second position such that light from the scene that fell onto the particular color pixel in the first position instead falls onto the particular infrared pixel in the second position.

13. The system of claim 10, wherein moving the image sensor to a second position comprises:
moving the image sensor to the second position such that light from the scene that fell onto the particular infrared pixel in the first position instead falls onto a second particular color pixel in the second position.

14. The system of claim 10, wherein generating a composite image based on the first image and the second image comprises:
generating the composite image to include a first pixel from the particular infrared pixel while the image sensor was in the first position and a second pixel, at a different location in the composite image than the first pixel, from the particular infrared pixel while the image sensor was in the second position.

15. The system of claim 10, wherein the image sensor includes a pattern of infrared pixels and color pixels, where the pattern includes an infrared pixel, a first green color pixel adjacent and to the right of the infrared pixel, a red color pixel adjacent and below the first green pixel, and a second green color pixel adjacent and below the infrared pixel.

16. The system of claim 15, the operations comprising:
obtaining, by the image sensor, a third image of the scene while the image sensor is in a third position, wherein, in the third position, the particular infrared pixel is located where a second particular color pixel was previously located when the image sensor was in the first position; and obtaining, by the image sensor, a fourth image of the scene while the image sensor is in a fourth position, wherein, in the fourth position, the particular infrared pixel is located where a third particular color pixel was previously located when the image sensor was in the first position, wherein generating a composite image based on the first image and the second image comprises:

generating the composite image based on the first image, the second image, the third image, and the fourth image.

17. The system of claim 10, wherein obtaining, by an image sensor that includes infrared pixels and color pixels, a first image of a scene while the image sensor is in a first position comprises:

obtaining an infrared image of the scene from the infrared pixels in the image sensor and not from the color pixels in the image sensor.

18. The system of claim 10, wherein obtaining, by an image sensor that includes infrared pixels and color pixels, a first image of a scene while the image sensor is in a first position comprises:

obtaining a first infrared image with the infrared pixels while an infrared emitter is emitting infrared onto the scene; and obtaining a first color image with the color pixels while the infrared emitter is not emitting infrared onto the scene, wherein generating a composite image based on the first image and the second image comprises:

generating a composite infrared image based on the first infrared image and a second infrared image; and generating a composite color image based on the first color image and a second color image.

19. A non-transitory computer-readable medium storing instructions executable by one or more computers which, upon such execution, cause the one or more computers to perform operations comprising:

obtaining, by an image sensor that includes infrared pixels and color pixels, a first image of a scene while the image sensor is in a first position;

moving the image sensor to a second position, wherein, in the second position, a particular infrared pixel is located where a particular color pixel was previously located when the image sensor was in the first position;

obtaining, by the image sensor, a second image of the scene while the image sensor is in the second position; and generating a composite image based on the first image and the second image.

20. The medium of claim 19, wherein moving the image sensor to a second position comprises:

moving the image sensor to the second position such that the particular infrared pixel is located where a particular color pixel was previously located when the image sensor was in the first position, relative to a camera that includes the image sensor.

* * * * *